June 12, 1956  D. M. PEARL  2,749,771
PEDAL ELEVATORS
Filed Aug. 16, 1954  2 Sheets-Sheet 2
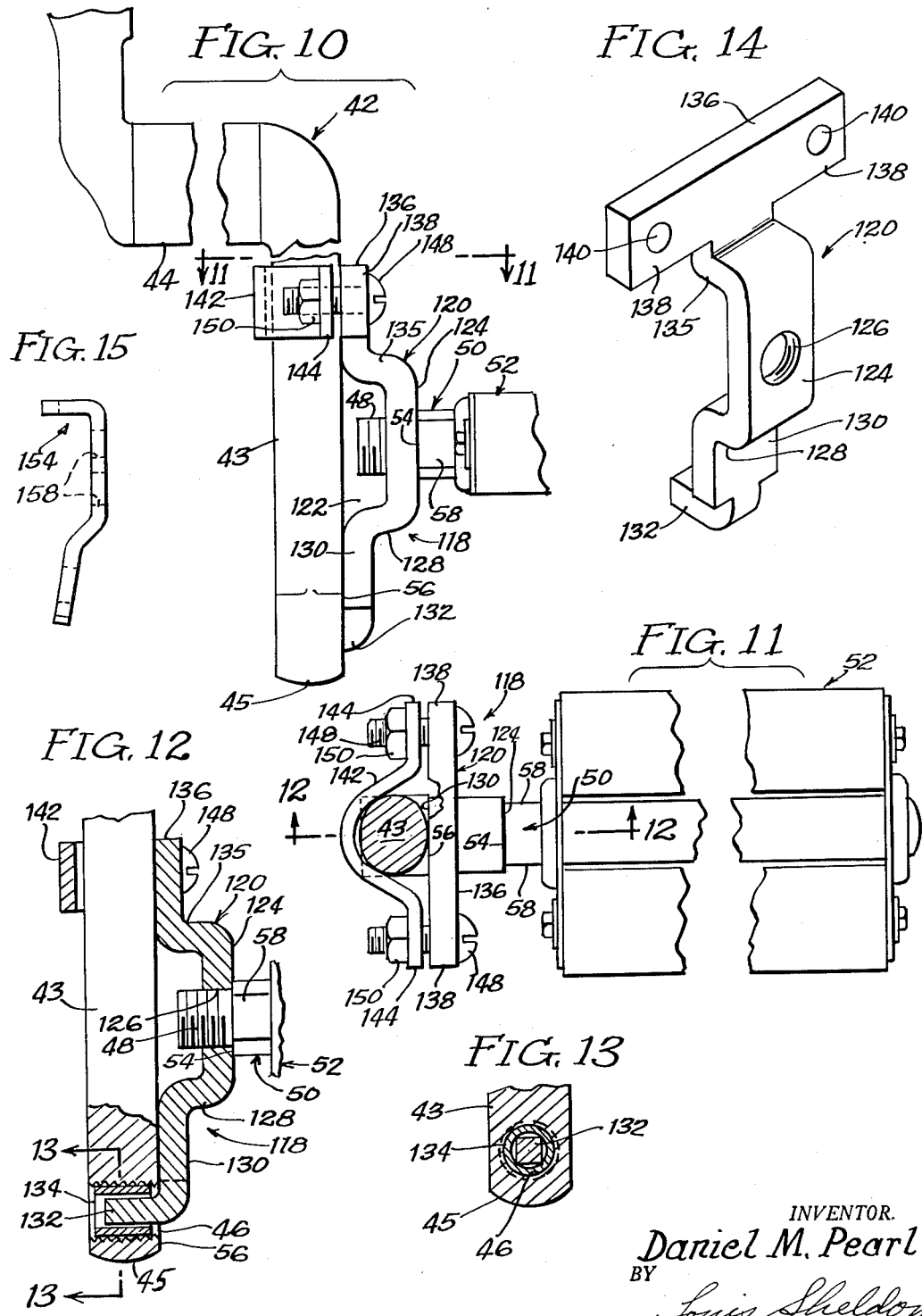
INVENTOR.
Daniel M. Pearl
BY
Louis Sheldon
Att'y

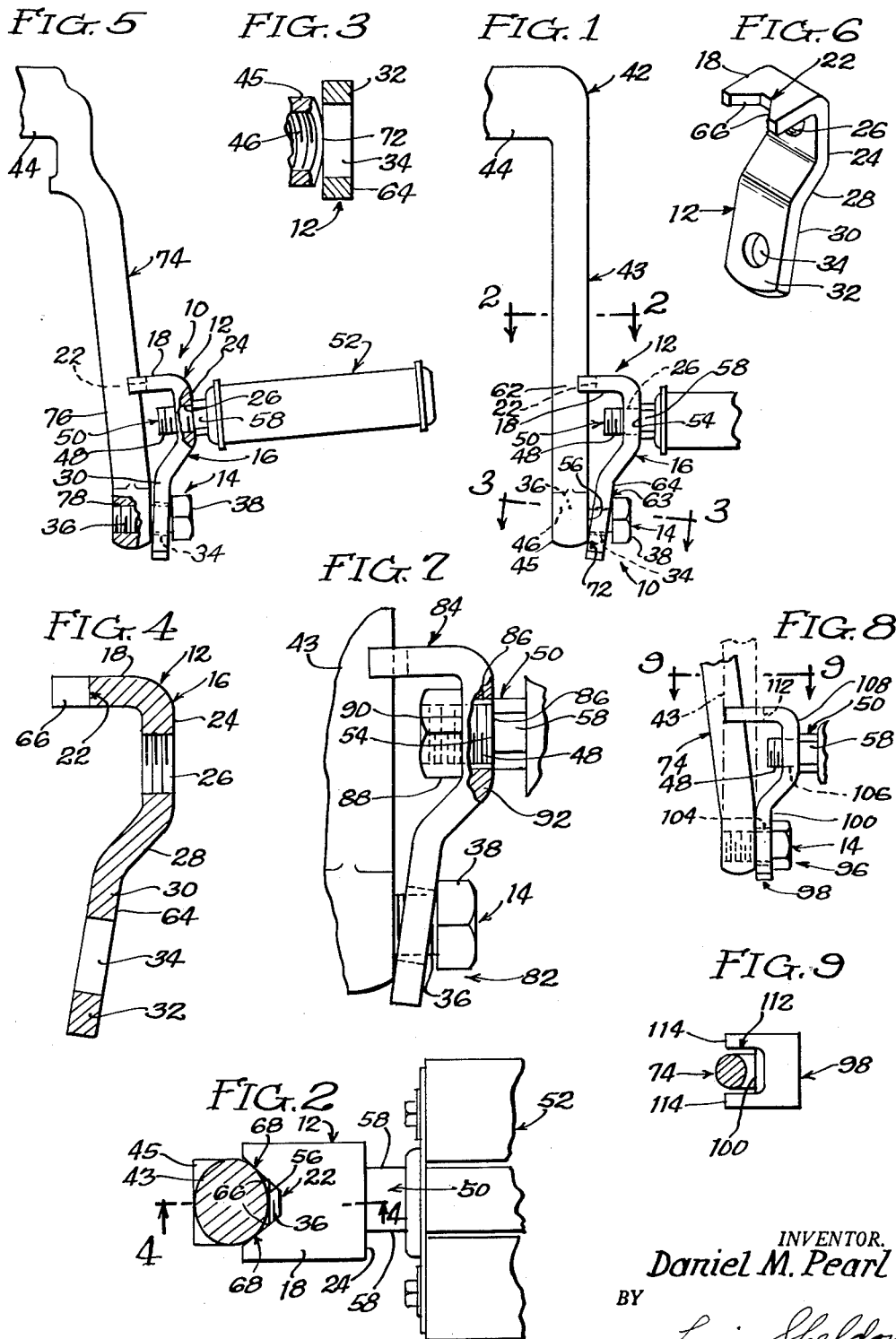

United States Patent Office 2,749,771
Patented June 12, 1956

2,749,771

PEDAL ELEVATORS

Daniel M. Pearl, Skokie, Ill., assignor to Darwin Products Inc., Chicago, Ill., a corporation of Illinois Application August 16, 1954, Serial No. 450,007

4 Claims. (Cl. 74—594.4)

This invention relates to velocipedes such as bicycles, and is concerned more particularly with the adaptation of such a vehicle to use by a child whose legs are not long enough to reach to the pedals where they are originally mounted on the cranks, when the pedals are lowermost. Thus the one vehicle may be used by the child with the invention until he is old enough to operate it without the invention.

It is an object of the invention, in addition to that noted above, to provide a pedal elevator which is of simple, inexpensive, and rugged construction and is capable of being speedily applied and removed without requiring skill and with which no build-up of the original pedals is required.

A further object is to provide a pedal adapter construction capable without modification of use with cranks extending normal to and those inclined to the crank shaft axes.

Further objects and advantages of the invention will appear as the description proceeds.

The invention will be better understood upon reference to the following description and the accompanying drawing, in which:

Fig. 1 is an elevational view showing one embodiment of the invention.

Figs. 2 and 3 are actual size sectional views taken as indicated by the lines 2—2 and 3—3, respectively, in Fig. 1.

Fig. 4 is a sectional view taken as indicated by the line 4—4 in Fig. 2.

Fig. 5 is similar to Fig. 1 but shows a crank other than normal to the shaft axis.

Fig. 6 is a perspective view of the pedal elevator bracket shown in Figs. 1 and 2.

Fig. 7 is similar to Fig. 1 but shows a modified pedal elevator construction.

Fig. 8 is similar to Fig. 1 but shows a still further modification.

Fig. 9 is a sectional view taken as indicated by the line 9—9 in Fig. 8.

Fig. 10 is similar to Fig. 1 but shows another modification.

Fig. 11 is a sectional view taken as indicated by the line 11—11 in Fig. 10.

Fig. 12 is a sectional view taken as indicated by the line 12—12 in Fig. 11.

Fig. 13 is a sectional view taken as indicated by the line 13—13 in Fig. 12.

Fig. 14 is a perspective view of the main bracket of the device shown in Figs. 10 to 13.

Fig. 15 is an elevational view of still another modification.

Referring now more particularly to the drawing, disclosing illustrative embodiments of the invention, one form of crank shortener is shown at 10 (Figs. 1 to 6) and comprises a bracket 12 and a bolt 14. The bracket 12 may be cast or forged but is preferably formed of steel bar stock. The bracket 12 has a recessed head portion 16 comprising an arm 18 whose free end is formed with a V-notch 22, a bight 24 having a tapped hole 26 therethrough, and an arm 28 having an extension 30 projecting away from the first arm, said extension adjacent its free end 32 having a hole 34 larger in diameter than the bolt shank 36 but smaller than the bolt head 38.

There is considerable variation in bicycle pedal crank construction conventionally in use insofar as the angles which the cranks or parts thereof make with the crank shaft are concerned. In some bicycles both cranks extend throughout at right angles to the shaft. In others, both cranks extend at obtuse angles to the shaft. In still others, one crank extends at right angles to the shaft and the other crank extends at one or another obtuse angle to the shaft. Each crank shortener of the invention is equally adaptable to all such types of crank, as will appear.

There is shown at 42 a bicycle crank shaft structure having a crank 43 extending normal to the shaft 44, the crank having at its free end 45 a tapped hole 46 for the reception of the threaded end 48 of the axle 50 about which a pedal tread 52 is journaled, said axle having a shoulder 54 adapted to engage the crank at the outboard end 56 of the hole, said axle also having flattened faces 58 for wrench engagement.

When the crank shortener 10 is to be applied, the pedal axle 50 is unscrewed from the crank hole 46, the bracket 12 is so positioned at the outboard side of the crank 43 that an intermediate part 62 of the crank is disposed in the bracket notch 22 and the bracket hole 34 is disposed adjacent the outboard end 56 of the crank hole, and the bolt shank 36 is passed through the bracket hole and threaded into the crank hole until the bolt head pressure at the point 63 against the outboard face 64 of the bracket effects firm engagement of the crank part 62 with the notch walls 66 as indicated at 68. Now the pedal axle 50 is threaded into the bracket hole 26 until the shoulder 54 is in secure engagement with the outboard face 70 of the bracket bight 24, thus completing the installation.

It will be noted that the bracket extension 30 is somewhat inclined to the crank 43, so as to fulcrum thereagainst as indicated at 72, the bracket 12 thus functioning as a lever of the third class, insuring engagement of the crank with the notch walls 66 when the bolt 14 is tightened. The amount of turning of the bolt 14 to obtain such engagement will vary somewhat with the cross-sectional shapes of cranks, and clearance is afforded by virtue of the fulcrum arrangement to enable such engagement to be achieved in each case.

The bracket bight 24 is arranged so that the axis of its hole 26 is parallel or substantially parallel to the axis of the crank shaft 44 when the bracket 12 is secured to the crank 43.

When the crank-shortener 10 is used with a crank such as that shown at 74 (Fig. 5) which, or the outer portion 76 of which, extends obtusely to the crank shaft 44, the installation procedure is the same as described above. In such a crank, the free end portion 78 is normal to the shaft 44, but, due to the inboard inclination of the outer crank portion 76 from the crank end portion, the bracket extension 30 forms a somewhat more acute angle with the crank end portion in order to effect engagement of said outer crank portion with the notch walls 66, as shown. Accordingly, the axis of the tapped hole 26 and hence of the pedal axle 50 secured therein is somewhat inclined outboard toward the axis of the shaft 44, but the degree of inclination is too slight to adversely affect the rider. If desired, however, the bracket bight 24 could be arranged so that the axis of the tapped hole 26 therein is inclined slightly in an outboard direction away from the crank shaft axis when the bracket is applied to a crank such as the crank 43 so as to reduce the maximum tilt of the pedal axle relative to the crank shaft axis when the bracket is applied to a crank such as the crank 74. This is a matter of choice since, as noted above, the inclination of the pedal axle encountered in practice is in any event inconsequential.

The bight 24 is substantially spaced from the crank in any event so that adequate clearance is afforded to allow the threaded end 48 of the pedal axle 50 to project inboard beyond the bight without interference from the crank. The threaded ends of pedal axles may vary somewhat with pedal manufacturers, and for this reason added clearance is afforded, although generally the length is found to be about one-half inch.

Inasmuch as it is the practice in bicycle manufacture to make the threads of the right and left cranks respectively left hand and right hand, and the pedal axle ends to correspond, the bolt and tapped bracket hole for the right crank will have left hand threads and the bolt and tapped bracket hole for the left crank will have right hand threads.

When the child's legs have grown sufficiently to enable his feet to operate the bicycle as originally assembled, the bolts 14 are removed, and the pedals are removed from the brackets and mounted directly on the crank ends.

The modified crank shortener 82 (Fig. 7) comprises a bracket 84 differing from the bracket 12 only in that instead of having a tapped hole in the bight, it has a smooth hole 86 through which the pedal axle end 48 is adapted to pass. A nut 88 is then threaded about the protruding part of the pedal axle end 48 and tightened against the inner face 90 of the bight 92.

For each bicycle installation, one bracket 12 can be used only for the right crank and the other bracket 12 can be used only for the left crank, due to the necessity for a left hand thread at the right crank and a right hand thread at the left crank, as noted above. Moreover, bicycles of foreign manufacture use a different thread diameter from those of domestic manufacture, so that, with threaded brackets, a set of right and left brackets usable for a domestic bicycle cannot be used for a foreign bicycle. The requirement for different right and left brackets is obviated when brackets 84 are used, since they are identical for both cranks, and in making such a bracket it is necessary only to punch two holes and a notch and bend to shape, if bar stock is used, or cast or forge the bracket without further ado.

Another crank shortener construction is shown at 96 (Figs. 8 and 9) and comprises a bolt 14 and a bracket 98 which resembles the bracket 12 except that the arm portion 100, formed with a hole 104 for the attaching bolt 14, is not adapted to fulcrum against the crank end but preferably lies flat against it about the crank hole 46 as shown, the axis of the tapped hole 106 in the part 108 of the bracket 98 being thus adapted to extend horizontally in all cases regardless of the angularity of the crank; and the arm 110 is formed with a U-notch 112 and is elongated to insure straddling of the crank by the fingers 114 defining the notch regardless of the angularity of the crank found in practice.

The further modified crank shortening structure 118 (Figs. 10 to 14) does not require a bolt for the crank hole. The structure 118 comprises a bracket 120 having a recess 122 whose bight 124 has a tapped hole 126 for the reception of the pedal axle end 48, one side 128 of said recess having an extension 130 adapted to engage the outboard side of the crank, including the flat face 56 adjacent the crank hole 46, said extension terminating in a lug 132 adapted to project into the crank hole and to be covered by a brass, rubber, or other relatively soft sleeve 134 to protect the crank hole thread. The other side 135 of the recess 122 has a relatively wide extension 136, coplanar with the extension 130 and adapted to engage the outboard side of the crank and having ends 138 formed with holes 140. The structure 118 also includes a clamp yoke 142 adapted to engage the inboard side of the crank and having ends 144 formed with holes adapted to register with the holes 140 for the reception of bolts 148 with which nuts 150 cooperate to clamp the bracket 120 to the crank.

The brackets 98 and 120 could be modified to eliminate the thread for the pedal axle end in the respect noted above in connection with the bracket 84.

If desired, any or all of the several bights may be elongated and formed with one or more additional holes to selectively accommodate the pedal axle end 48 so that the shortening of the effective length of the cranks of any vehicle may be further varied. Such a construction is shown by way of example at 154, wherein it will be noted that the bracket has two holes 158 for the selective reception of the pedal axle end 48.

Various modifications may suggest themselves to those skilled in the art without departing from the spirit of my invention. Hence, I do not wish to be restricted to the specific forms shown or uses mentioned, except to the extent indicated in the appended claims, which are to be interpreted as broadly as the state of the art will permit.

I claim:

1. A crank shortening pedal adapter for the crankshaft structures of bicycles and the like, wherein the crank thereof extends normal or somewhat obtuse to the rotating axis of the crankshaft structure, wherein the free end of the crank has an outboard surface normal to the rotating axis of the crankshaft structure and wherein the free end of the crank has a tapped hole whose axis is parallel to the rotating axis of the crankshaft structure and which normally receives the threaded end of the axle of a pedal, said crank shortening pedal adapter comprising, an elongated bracket arranged along the outboard side of the crank, said bracket being generally concavo-convex along its length with its concave side facing the crank and provided at one end with an inturned arm having a V-notch receiving and engaging the outboard side of the crank at two points and provided at its other end with an inclined arm overlying the normal outboard surface on the free end of the crank and engaging said surface at a point beyond the tapped hole in the crank, said inclined arm being provided with an enlarged hole in alignment with the tapped hole in the crank, and a bolt extending through the enlarged hole in the inclined arm of the bracket and threaded into the tapped hole in the crank for stressing the bracket and rigidly clamping the bracket to the crank at said three points of engagement, and a hole in the bracket intermediate its ends for receiving the axle of the pedal.

2. A crank shortening pedal adapter for the crankshaft structures of bicycles and the like, wherein the crank thereof extends normal or somewhat obtuse to the rotating axis of the crankshaft structure, wherein the free end of the crank has an outboard surface normal to the rotating axis of the crankshaft structure and wherein the free end of the crank has a tapped hole whose axis is parallel to the rotating axis of the crankshaft structure and which normally receives the threaded end of the axle of a pedal, said crank shortening pedal adapter comprising, an elongated bracket arranged along the outboard side of the crank, said bracket being generally concavo-convex along its length with its concave side facing the crank and provided at one end with an inturned arm having a V-notch receiving and engaging the outboard side of the crank at two points and provided at its other end with an inclined arm overlying the normal outboard surface on the free end of the crank and engaging said surface at a point beyond the tapped hole in the crank, said inclined arm being provided with an enlarged hole in alignment with the tapped hole in the crank, and a bolt extending through the enlarged hole in the inclined arm of the bracket and threaded into the tapped hole in the crank for stressing the bracket and rigidly clamping the bracket to the crank at said three points of engagement, and a tapped hole in the bracket intermediate its ends for receiving the threaded end of the axle of the pedal.

3. A crank shortening pedal adapter for the crankshaft structures of bicycles and the like, wherein the crank thereof extends normal or somewhat obtuse to the rotating axis of the crankshaft structure, wherein the free end of the crank has an outboard surface normal to the rotating axis of the crankshaft structure and wherein the free end of the crank has a tapped hole whose axis is parallel to the rotating axis of the crankshaft structure and which normally receives the threaded end of the axle of a pedal, said crank shortening pedal adapter comprising, an elongated bar bracket of uniform thickness arranged along the outboard side of the crank, said bracket being formed at one end with an inturned arm arranged substantially normal to the crank and provided with a V-notch receiving and engaging the outboard side of the crank at two points, being formed at its other end with an inclined arm overlying the normal outboard surface on the free end of the crank and inclined with respect thereto so as to engage said surface at a point beyond the tapped hole in the crank, and being formed intermediate its ends with a central portion spaced from and parallel to the crank, said inclined arm being provided with an enlarged hole in alignment with the tapped hole in the crank, and a bolt extending through the enlargd hole in the inclined arm of the bracket and threaded into the tapped hole in the crank for stressing the bracket and rigidly clamping the bracket to the crank at said three points of engagement, and a hole in the central portion of the bracket for receiving the axle of the pedal.

4. A crank shortening pedal adapter for the crankshaft structures of bicycles and the like, wherein the crank thereof extends normal or somewhat obtuse to the rotating axis of the crankshaft structure, wherein the free end of the crank has an outboard surface normal to the rotating axis of the crankshaft structure and wherein the free end of the crank has a tapped hole whose axis is parallel to the rotating axis of the crankshaft structure and which normally receives the threaded end of the axle of a pedal, said crank shortening pedal adapter comprising, an elongated bar bracket of uniform thickness arranged along the outboard side of the crank, said bracket being formed at one end with an inturned arm arranged substantially normal to the crank and provided with a V-notch receiving and engaging the outboard side of the crank at two points, being formed at its other end with an inclined arm overlying the normal outboard surface on the free end of the crank and inclined with respect thereto so as to engage said surface at a point beyond the tapped hole in the crank, and being formed intermediate its ends with a central portion spaced from and parallel to the crank, said inclined arm being provided with an enlarged hole in alignment with the tapped hole in the crank, and a bolt extending through the enlarged hole in the inclined arm of the bracket and threaded into the tapped hole in the crank for stressing the bracket and rigidly clamping the bracket to the crank at said three points of engagement, and a tapped hole in the central portion of the bracket for receiving the threaded end of the axle of the pedal.

References Cited in the file of this patent

UNITED STATES PATENTS

| | | |
|---|---|---|
| 363,522 | Knous | May 24, 1887 |
| 510,620 | Smith | Dec. 12, 1893 |
| 855,905 | Rhoads | June 4, 1907 |
| 1,213,825 | Bloom | Jan. 30, 1917 |
| 1,679,168 | O'Brien | July 31, 1928 |
| 1,894,985 | Flowers | Jan. 24, 1933 |
| 1,996,249 | McCann | Apr. 2, 1935 |
| 2,078,324 | Griffiths | Apr. 27, 1937 |
| 2,461,135 | Bentley | Feb. 8, 1949 |

FOREIGN PATENTS

| | | |
|---|---|---|
| 501,665 | Belgium | Mar. 31, 1951 |